United States Patent
Becker et al.

(10) Patent No.: US 9,768,624 B2
(45) Date of Patent: Sep. 19, 2017

(54) METHOD FOR CELL BALANCING FOR A PLURALITY OF BATTERY CELLS, AND BATTERY SYSTEM FOR PERFORMING SUCH A METHOD

(71) Applicant: Robert Bosch GmbH, Stuttgart (DE)

(72) Inventors: Jens Becker, Ludwigshafen am Rhein (DE); Andre Boehm, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 14/872,282

(22) Filed: Oct. 1, 2015

(65) Prior Publication Data
US 2016/0099587 A1     Apr. 7, 2016

(30) Foreign Application Priority Data

Oct. 2, 2014  (DE) .................. 10 2014 220 005

(51) Int. Cl.
*H02J 7/00* (2006.01)
*B60L 11/18* (2006.01)

(52) U.S. Cl.
CPC ......... *H02J 7/0016* (2013.01); *B60L 11/1861* (2013.01); *H02J 7/007* (2013.01); *H02J 7/0021* (2013.01); *Y02T 10/7055* (2013.01)

(58) Field of Classification Search
CPC .................................................. H02J 7/0016
USPC ................................................ 320/116, 119
See application file for complete search history.

(56) References Cited

U.S. PATENT DOCUMENTS

| | | | | |
|---|---|---|---|---|
| 2010/0085009 A1* | 4/2010 | Kang | .................. | H01M 10/482 320/118 |
| 2010/0277123 A1* | 11/2010 | Lim | ..................... | H02J 7/0016 320/116 |
| 2011/0163720 A1 | 7/2011 | Gonzales et al. | | |
| 2014/0285151 A1 | 9/2014 | Steck et al. | | |
| 2014/0285152 A1 | 9/2014 | Becker et al. | | |

FOREIGN PATENT DOCUMENTS

| | | |
|---|---|---|
| DE | 102013204885 | 9/2014 |
| DE | 102013204888 | 9/2014 |
| JP | 2008295250 | 12/2008 |

* cited by examiner

*Primary Examiner* — Edward Tso
*Assistant Examiner* — Ahmed Omar
(74) *Attorney, Agent, or Firm* — Michael Best & Friedrich LLP

(57) ABSTRACT

A method for cell balancing for a plurality of battery cells. Such a method involves the cell balancing being performed on the basis of a need that can be ascertained comparatively accurately. The method described above allows equalization of the states of charge, or cell balancing, based on the state of charge of the battery cells to be made possible, even without knowledge of the capacities of the in particular series-connected battery cells, such that the loss of charge as a result of the cell balancing is particularly low. Hence, a loss of charge as a result of unnecessary equalization of the charge can be prevented or at least significantly reduced.

10 Claims, 2 Drawing Sheets

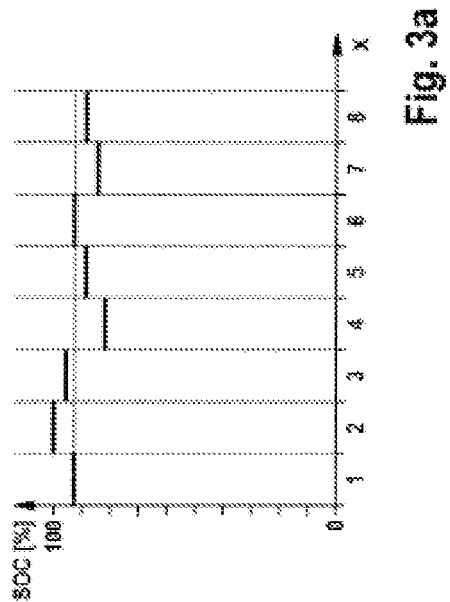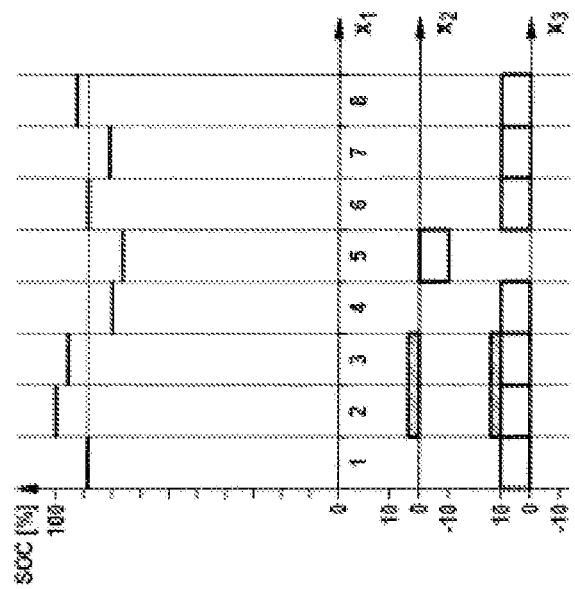

METHOD FOR CELL BALANCING FOR A PLURALITY OF BATTERY CELLS, AND BATTERY SYSTEM FOR PERFORMING SUCH A METHOD

FIELD

The present invention relates to a method for cell balancing for a plurality of battery cells and also to a battery system that is designed to carry out such a method.

BACKGROUND

Electrochemical energy stores, such as lithium-ion batteries, are widely used in many daily applications. By way of example, they are used in computers, such as laptops, cell phones, smart phones and further applications. Such batteries also afford advantages for the currently heavily promoted electrification of vehicles, such as motor vehicles, for example for electric vehicles or hybrid vehicles.

By way of example, lithium-ion batteries, for example for the automotive field of use, often comprise a plurality of individual battery cells. In order to increase the voltage or current level, these cells are connected up to one another in parallel or in series and combine mechanically to form modules. A battery management system is additionally used to monitor the battery and is intended to allow not only safety monitoring but also the longest possible life.

In order to increase life, for example, it is known practice to match the state of charge of the battery cells to one another. This process is also referred to as cell balancing. By way of example, the document US 2011/0163720 A1 discloses a motor vehicle that has an electric motor, a battery, an interface for a driver and one or more control units. In this case, when there is an imbalance in the states of charge of battery cells in the battery, a warning needs to be output to the interface for the driver and the states of charge need to be aligned on the basis of a response. In this case, the states of charge can be aligned on the basis of the self-discharge rate, for example.

The document JP 2008-295250 additionally describes a method for monitoring the uniformity of the states of charge of battery cells. In this case, the cell voltages of the battery cells are ascertained during charging and during discharging and a control unit selectively discharges battery cells in a discharge circuit.

SUMMARY OF THE INVENTION

The subject matter of the present invention is a method for cell balancing for a plurality of battery cells, having the method steps of:

a) determining the state of charge of each battery cell in the plurality of battery cells at a time $t_1$ on condition that predefined constraints for ascertaining the states of charge of the battery cells exist;

b) determining the state of charge of each battery cell in the plurality of battery cells at a time $t_2$, there being a selectable period between $t_1$ and $t_2$, on condition that predefined constraints for ascertaining the states of charge of the battery cells exist;

c) determining a relative difference for the self-discharge rates of the plurality of battery cells on the basis of the states of charge ascertained under method steps a) and b);

d) determining the state of charge of each battery cell in the plurality of battery cells at a time $t_3$; and e) carrying out cell balancing for the plurality of battery cells, wherein e1) the cell balancing for the battery cells is effected on the basis of a need that is ascertained by directly taking account of the states of charge of the battery cells at the time $t_3$ when the state of charge of the battery cells at a time $t_3$ can be ascertained on condition that predefined constraints for ascertaining the states of charge of the battery cells exist; or wherein e2) the cell balancing for the battery cells is effected on the basis of a need that is ascertained by taking account of the relative difference in the self-discharge rates of the plurality of battery cells when the state of charge of the battery cells at a time $t_3$ cannot be ascertained on condition that predefined constraints for ascertaining the states of charge of the battery cells exist.

In this case, the method steps described above can, in principle, proceed in the order described above or at least to some extent simultaneously, but the method does not have to be limited to the aforementioned order for the purposes of the present invention.

The method described above allows cell balancing based on the state of charge of the battery cells to be made possible, even without knowledge of the capacities of the in particular series-connected battery cells, such that the loss of charge as a result of the cell balancing is particularly low. In this case, the state of charge is intended to be understood to mean particularly the % proportion of a full charge of the battery cell for a given capacity.

The method described above is therefore used to equalize, or match to one another, states of charge of a plurality of battery cells. In this case, the battery cells are arranged in a battery module or form the latter, particularly in the manner that is known per se, and in that case are connected up in series or parallel, for example. In this case, the method can relate to a group of battery cells, that is to say, by way of example, to some of the battery cells of the battery module, or, for example, to all of the battery cells arranged in a battery module.

By way of example, cell balancing among the battery cells can be necessary as a result of the cells being able to have a different self-discharge rate and hence the state of charge of the cells being able to be altered differently among the cells in a certain period. Furthermore, the capacities of the individual battery cells can also differ from one another, for example as a result of production variations. This effect can sometimes be ignored at the beginning of the life, but can become greater over the course of the life as a result of differences in the cell ageing, and can result in a capacity difference of several percent between the battery cells.

In order to prevent this, cell balancing performed by the method described above can allow the states of charge (SOC) of the individual battery cells to be attuned to one another despite different self-discharge and possibly different capacities. In this case, particularly the states of charge of the cells are attuned to one another, the state of charge of a battery module comprising the battery cells being able to be defined as the minimum over all the states of charge of the battery cells, for example.

In this case, the states of charge can be equalized at an interval of time on the basis of the state of the battery cells, for example the age thereof. Usually, the states of charge can be equalized at an interval of one week or more, for example two weeks, the values being in no way limiting. In principle, the states of charge of the battery cells can be equalized when the difference in the states of charge of the battery cells is above a threshold value.

In order to implement this, the method described above comprises, according to method step a), determining the state of charge of each battery cell in the plurality of battery cells at a time $t_1$ on condition that predefined constraints for ascertaining the states of charge of the battery cells exist. In other words, the state of charge of each of the plurality of battery cells is determined. This method step is based on the states of charge of the individual battery cells in a battery module being able to differ from one another, for example on account of different capacities or self-discharge rates, as explained in detail above, so that the state of charge of each of the battery cells should be ascertained.

In this case, the state of charge of the battery cells can be ascertained, as is known in principle to a person skilled in the art. By way of example, the states of charge of the battery cells can be ascertained by ascertaining the respective cell voltage of the relevant battery cell, so as to take stored discharge curves as a basis for ascertaining the state of charge that corresponds to the voltage.

The state of charge of the battery cells is ascertained on condition that predefined constraints exist. Hence, the method described above involves the state of charge being ascertained only when the relevant battery cell is in a state that can allow particularly precise ascertainment of the state of charge. By way of example, provision may be made for the battery cells to have at least one predetermined state of charge or to be in a relaxed state, that is to say to have passed through a certain idle phase or recovery phase. In this case, the corresponding predetermined constraints can match the specific instance of application, so that particularly precise determination of the states of charge is possible for any application and for any incident.

In addition, the method comprises, according to method step b), determining the state of charge of each battery cell in the plurality of battery cells at a time $t_2$, there being a selectable and, by way of example, predefined period between $t_1$ and $t_2$, on condition that predefined constraints for ascertaining the states of charge of the battery cells exist. Hence, after a period, for example and without limitation a week after the first determination of the state of charge at the time $t_1$, the state of charge is determined a further time at the time $t_2$, so that the self-discharge or self-discharge differences of the battery cells in a defined period can be ascertained. In principle, the period between $t_1$ and $t_2$ may be dependent on the specific field of application, previous equalization processes and on the amount of use, that is to say duration and/or intensity, of the battery. For details of the constraints of the measurements of the time $t_2$, reference is made to the explanations above with regard to the time $t_1$, wherein the constraints to be observed should, in particular, be the same for both measurements in order to allow particularly precise measurement. Hence, it is again preferred for the state of charge of the battery cells to be above a predetermined value, for example for the battery cells to be fully charged. In addition, it may be preferred for the battery cells to be in a relaxed state.

According to method step c), the method described above additionally comprises determining a relative difference for the self-discharge rates of the plurality of battery cells on the basis of the states of charge ascertained under method steps a) and b). This method step is based on the self-discharge rates of the individual battery cells in a battery module being able to differ from one another, so that the self-discharge rate of at best each of the battery cells should be ascertained. In this case, self-discharge means operations that proceed automatically in a manner that is known per se, which operations prompt battery cells to discharge to a certain proportion, even when there is no electrical load connected. Hence, the self-discharge rate is the self-discharge of the respective battery cell in a particular period.

In this case, it may additionally be advantageous, in principle, if no equalization of states of charge or no cell balancing takes place between the times $t_1$ and $t_2$, so as to allow ascertainment of the self-discharge or of the self-discharge differences particularly accurately.

In detail, to determine the self-discharge differences it is first of all possible to determine a reference cell, the reference cell being part of the plurality of battery cells. The reference cell is a battery cell to which all of the self-discharge differences of the respective battery cells are referenced and that is part of the plurality of battery cells. On the basis of the ascertained states of charge at the times $t_1$ and $t_2$, it is furthermore possible to determine the self-discharge differences of the individual cells, that is to say of all of the cells in the plurality of battery cells with the exception of the reference cell, with reference to the reference cell. In other words, provision may preferably be made for method step c) to be effected by selecting a reference cell from the plurality of battery cells and by comparing the self-discharge rates of the remainder of the battery cells in the plurality of battery cells with the self-discharge rate of the reference cell. In this case, if the reference cell has the same conditions, for example a like state of charge and the same relaxation state, at both measurement times $t_1$ and $t_2$, the states of charge of the further battery cells are ascertained and in this way the differences in the self-discharge of the remainder of the battery cells, that is to say of all of the battery cells in the plurality of battery cells with the exception of the reference cell, are determined in relation to the reference cell.

The method described above additionally comprises the method step d), according to which the state of charge of each battery cell in the plurality of battery cells is determined at a time $t_3$. Hence, in this step, the instantaneous state of charge of the battery cells is ascertained particularly at the time $t_3$ and hence at the time at which cell balancing is meant to be performed or the need for cell balancing is meant to be ascertained.

The cell balancing for the plurality of battery cells is effected according to method step e). In this method step, the individual battery cells are therefore synchronized or the states of charge of the battery cells are aligned with one another. This step can be performed, in principle, as is known from the prior art. By way of example, the battery cells having a comparatively high state of charge can be discharged to a value that corresponds to the state of charge of the battery cell that has the comparatively lowest state of charge of the plurality of battery cells.

In this case, the method described above has provision for the cell balancing not necessarily to proceed according to a predetermined method or a need ascertained in a defined manner, but rather for the cell balancing to proceed instead on the basis of a need that can be ascertained as precisely as possible under the prevailing conditions.

In detail, according to method step e1) the cell balancing for the battery cells is effected on the basis of a need that is ascertained by directly taking account of the states of charge of the battery cells at the time $t_3$ when the state of charge of the battery cells at a time $t_3$ can be ascertained on condition that predefined constraints for ascertaining the states of charge of the battery cells exist. The method described above additionally has provision for, according to method step e2), the cell balancing for the battery cells to be effected on the basis of a need that is ascertained by taking account of the relative difference in the self-discharge rates of the plurality of battery cells when the state of charge of the battery cells at a time $t_3$ cannot be ascertained on condition that predefined constraints for ascertaining the states of charge of the battery cells exist.

The method described above is therefore based on the cell balancing or the alignment of the states of charge of the battery cells with one another not inevitably being based on presently measured states of charge of the in particular series-connected battery cells, but rather only if the measurement of the states of charge at the time at which need is determined satisfies predefined constraints and a need can therefore be ascertained with sufficient accuracy. In other words, cell balancing is based exclusively on values of the states of charge that are measured at a particularly favorable time, so that a measurement is particularly reliable. Hence, the prescribing of the constraints allows the accuracy of the measurement to be defined, for example by allowing factors that corrupt the measurement to be excluded.

In this case, the equalization of the state of charge of the battery cells on the basis of the state of charge of the battery cells can be effected by directly comparing the states of charge and discharging all of the cells to the state of charge that corresponds to the lowest measured state of charge.

If, when measuring the states of charge for determining need at the time $t_3$, the predetermined constraints cannot be observed, and hence when a reliable value for the states of charge at an instantaneous time $t_3$ cannot be ascertained, and equalization of the states of charge would therefore be potentially inaccurate or disproportionate, a method that is described above involves equalization of the states of charge of the battery cells being performed on the basis of the self-discharge or the self-discharge differences of the battery cells. This allows a significant improvement in the reliability of the matching of the states of charge. In other words, the states of charge of the battery cells can in this case be equalized on the basis of values that allow comparatively more exact or more reliable equalization of the states of charge, since the self-discharge rate differences have been ascertained under optimum conditions. By way of example, the corresponding data may in this case be stored in a control system, for example the battery management system.

In this case, equalization of the states of charge of the battery cells on the basis of the self-discharge or the relative self-discharge differences can mean that, starting from the last measurement of the state of charge or starting from the last matching of the states of charge on the basis of the stored self-discharge rate, the extent to which the state of charge has changed over a certain period is computed, so as to assess what level the states of charge of the individual battery cells are at. In this case, it suffices to take account of the self-discharge differences, since cell balancing essentially does not require the use of absolute values, but rather only relative values need to be used. On the basis of these values, the states of charge of the battery cells can then be equalized comparatively exactly. In particular, this step may be more accurate than equalization of the states of charge on the basis of inaccurately measured present or instantaneous values of the states of charge of the battery cells. As a result, the loss of charge as a result of state of charge equalization or cell balancing can be reduced to a minimum.

The method described above therefore makes it possible to prevent the battery cells from unnecessarily being permanently equalized such that they have a like state of charge. This can prevent a disproportionately large amount of charge from being lost, so that the performance of the battery can be increased over a longer life on account of reduced charging and discharging operations. In particular, it is possible to prevent the states of charge from being matched to a degree that would not have been necessary at all. Such a step, which is also known as spurious balancing, can be directly prevented by the method described above.

Furthermore, the method described above is distinguished in that alignment of the states of charge or cell balancing can be effected even with large capacity differences in the cells and even if the individual cell capacities are not known. In this case, the method described above is essentially as precise as when using capacities measured by a capacity estimation algorithm, but without having to contain an error in a capacity measurement.

In addition, the method described above can be used in a manner matched to the relevant circumstances and in this case independently of the power profile, for example when used in an at least to some extent electrically driven vehicle independently of the driving profile to which the battery is exposed.

Within the context of one embodiment, the predetermined constraints can comprise or be selected from the amount of the state of charge of at least one battery cell and a relaxation state of at least one battery cell. By way of example, the constraints can relate to a reference cell. In this embodiment, the state of charge can therefore be ascertained, or cell balancing on the basis of the instantaneous state of charge can be determined, by way of example, when at least one battery cell has a state of charge that is above a predefined value. By way of example, the state of charge can therefore be ascertained, or cell balancing on the basis of the instantaneous state of charge can be determined, by way of example, when the at least one battery cell, or preferably all the battery cells, has a state of charge of greater than or equal to 90%, for example greater than or equal to 99%, that is to say in other words is fully charged. As a further constraint, it is alternatively or additionally possible to select that at least one battery cell, preferably all of the battery cells, has passed through a predefined relaxation and hence a predefined idle phase in which no loads are supplied with power or the supply of power to loads is at least below a predefined threshold value or the battery cell has not been charged. Particularly in this embodiment, determination of the state of charge and hence of a need for cell balancing can be effected particularly reliably. This may be the case particularly when the at least one battery cell is at a state of charge level that is optimum for the measurement and/or when the battery cell has passed through a predefined idle state or is in an idle state. In this case, the aforementioned constraints may need to be observed for one or any number of the battery cells. By way of example, the aforementioned constraints may need to be observed for all of the battery cells examined.

Within the context of a further embodiment, provision may also be made for the method to have the further method steps of:

f) verifying the cell balancing for the battery cells according to method step e2) by means of method step e1); and g) if need be redetermining a relative difference for the self-discharge rates of the plurality of battery cells.

In this embodiment, it is therefore possible, when the prescribed constraints for determining the need for cell balancing on the basis of the instantaneously ascertainable state of charge exist, for the cell balancing performed to be verified, said cell balancing having been effected on the basis of the self-discharge rate differences, at a time at which the constraints did not exist. If cell balancing has been effected with preselected accuracy or precision, it is essentially possible to perform cell balancing on the basis of the ascertained state of charge. If the state of charge equalization performed, which has been effected on the basis of the self-discharge rate, does not have sufficient precision, the self-discharge rate differences of the battery cells can be redetermined. In this embodiment, it is therefore possible, even with a long operating period of the battery, to ensure that the states of charge of the battery cells are always equalized with very high precision, since either the state of charge is directly taken as a basis for equalization or cell balancing on the basis of the self-discharge rate is constantly checked for precision.

Within the context of a further embodiment, provision may be made for method step e) to be effected by specifically discharging at least one battery cell via a discharge resistor. In this embodiment, such resistive equalization of the states of charge of the battery cells can advantageously involve each battery cell having an associated resistor and an associated switching element in order to be able to discharge individual battery cells specifically via this discharge resistor and in this way to align the states of charge. In this case, the stored energy is essentially converted into heat and in this way the battery cells are discharged to a level that corresponds to the level of the battery cell having the lowest state of charge. In this case, since the method described above allows equalization of the states of charge of the battery cells to be reduced to a minimum degree on account of a high level of precision, as described in detail above, the number of switching cycles can likewise be significantly reduced, as a result of which the life of the switching units, by way of example, and also of the equalization resistors can be significantly increased. As a result, the method described above is advantageous, particularly in combination with connectable discharge resistors, for equalizing the state of the charge of the battery cells.

Within the context of a further embodiment, provision may additionally be made for a need for equalization of the state of charge of the battery cells to be ascertained when a battery system is started. By way of example, it is therefore possible for the state of charge of the battery cells to be equalized after the battery cells have not, or only to a limited extent, been discharged and charged for a certain time. In this embodiment, the battery cells can be operated particularly advantageously, since they have a standard state of charge essentially whenever they are operated. In addition, this embodiment allows cell balancing to be carried out directly, since this can be particularly advantageous in an idle state of the battery cells.

For further technical features and advantages of the method according to the invention, explicit reference is hereby made to the explanations in connection with the battery system according to the invention, the figures and the description of the figures.

The subject matter of the present invention is additionally a battery system, having a plurality of battery cells, wherein the battery system can ascertain the state of charge of the battery cells and the self-discharge rates of the battery cells and wherein the battery system can additionally perform cell balancing. A battery system that is described above is characterized in that the battery system has a control unit that is designed to carry out a method as described in detail above.

Such a battery system therefore has, in a manner that is known per se, a plurality of battery cells connected in series or parallel that, by way of example, may be arranged in a battery module or may form said battery module. The battery cells may be embodied in a manner that is known per se and be lithium-ion cells, for example, without being limited thereto, however.

In addition, a battery system that is described above has provision for the battery system to be able to ascertain the state of charge of the battery cells and the self-discharge rates of the battery cells. To this end, it is possible, particularly in a manner that is known per se, for means for voltage measurement for the cell voltage of the respective battery cells to be provided, so as, for example using a battery management system, to take stored discharge curves as a basis for ascertaining the state of charge that corresponds to the cell voltage. The same means can likewise be used in order to ascertain the self-discharge, since the states of charge can likewise be taken as a basis for ascertaining the self-discharge rates or the relative differences in the self-discharge rates.

In a battery system that is described above, provision is additionally made for the battery system to be able to equalize the states of charge of the battery cells. To this end, provision may be made, by way of example, for the battery system to have a plurality of discharge resistors for selectively discharging each of the battery cells. In this case, the respective discharge resistors can be connected to the individual battery cells, particularly by means of switching logic, such that the individual battery cells can be discharged via the discharge resistors. By way of example, one discharge resistor may be provided for each of the battery cells.

In addition, discharge of the battery cells for the purpose of equalizing the states of charge of the battery cells or for the purpose of cell balancing on the basis of a method that is described above can be performed by the battery system. To this end, a control unit, such as the battery management system that is usually present anyway, may be provided that is designed to perform such a method. To this end, the control system may be connected to the relevant components and in that case emit appropriate control commands. The control system may accordingly be equipped with appropriate control logic or software implementation.

Furthermore, the battery system may be arranged in an at least to some extent electrically drivable vehicle. Such a vehicle may be a completely electrically driven vehicle or a hybrid vehicle, for example.

The battery system described above allows equalization of the states of charge, or cell balancing, based on the state of charge of the battery cells to be made possible, even without knowledge of the capacities of the in particular series-connected battery cells, such that the loss of charge as a result of the cell balancing is particularly low. Hence, a loss of charge as a result of unnecessary equalization of the charge can be prevented or at least significantly reduced.

For further technical features and advantages of the battery system according to the invention, explicit reference is hereby made to the explanations in connection with the method according to the invention, the figures and the description of the figures.

BRIEF DESCRIPTION OF THE DRAWINGS

Further advantages and advantageous embodiments of the subjects according to the invention are illustrated by the drawings and explained in the description below, the features described being able to be the subject matter of the present invention individually or in any combination, unless the opposite is explicitly evident from the context. In this case, it should be noted that the drawings are only descriptive in nature and are not intended to restrict the invention in any form. In the drawings.

FIG. 3a shows a graph illustrating measurement of the states of charge of battery cells at a time $t_1$; and FIG. 3b shows a graph illustrating measurement of the states of charge of battery cells at a time $t_2$.

DETAILED DESCRIPTION

Figure 1:
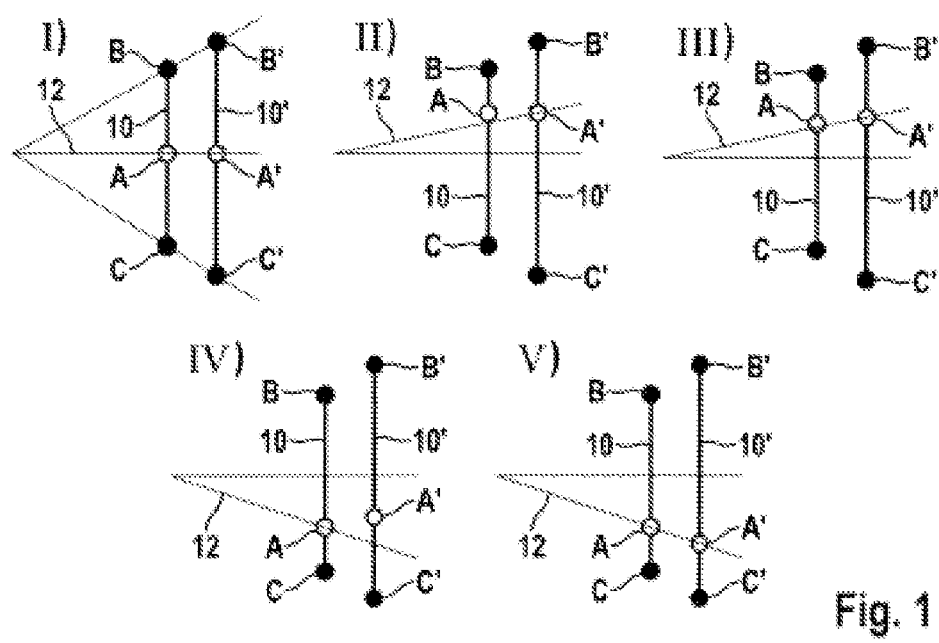
FIG. 1 shows a schematic illustration of cell balancing for two battery cells having different capacities in five different states.

FIG. 1 schematically shows cell balancing for two battery cells that each have a different capacity. In this case, a first battery cell has a lower capacity than a second battery cell. This is shown in FIG. 1 by the level of the axes 10, 10', which are each intended to represent the state of charge. In this case, stage I shows a state in which both battery cells have a state of charge of 50%, since the present state of charge A, A' lies exactly between the maximum value B, B', for example full charge, and the minimum value C, C', for example a completely discharged battery cell.

Toward state II, the battery cells are charged, but, given supply of the same quantity of charge, the battery cells no longer have the same state of charge owing to the capacity differences. This can be discerned from the fact that the two states of charge A, A' are no longer on the line 12, which is intended to show a unitary state of charge.

In order to equalize the state of charge towards state III, charge is therefore dissipated from the battery cell having the lower capacity so that the battery cells have the same state of charge.

If the battery cells are now discharged towards state IV with the same quantity of charge, the result of the different capacities of the battery cells is again that the state of charge is no longer unitary.

To align the state of charge towards state V, a battery cell can again be resistively discharged as part of cell balancing. In this case, the need for cell balancing towards state V is created to some extent by previously performed cell balancing toward state III.

It can therefore be seen that in systems in which the capacity of the individual battery cells is not known and cell balancing, particularly on a resistive basis, is effected toward a common state of charge of the battery cells, the total charge to be equalized can be comparatively high, since it is often not possible to prevent unnecessary charge that is far above the pure equalization of the various self-discharges from being dissipated via equalization resistors.

Figure 2:
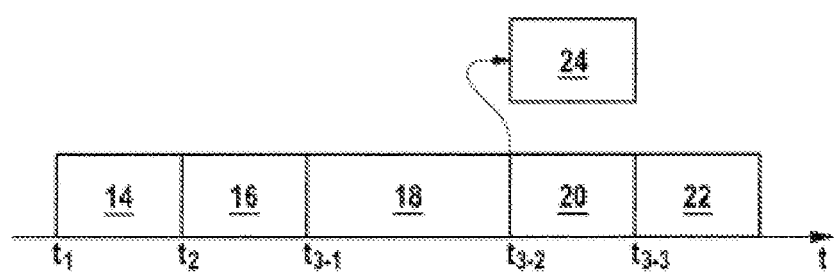
FIG. 2 shows a schematic block diagram illustrating the progress of a method for cell balancing.

A method for preventing this effect is shown schematically in FIG. 2. This shows a block diagram that is intended to represent the method.

In this case, the progress axis displays the time coordinate. At a time $t_1$, the state of charge of each battery cell in the plurality of battery cells is first of all determined on condition that predefined constraints for ascertaining the states of charge of the battery cells exist. In addition, at the state $t_2$, the state of charge of each battery cell in the plurality of battery cells is redetermined at a time $t_2$ on condition that predefined constraints for ascertaining the states of charge of the battery cells exist, there being a selectable, for example predefined, period 14 between $t_1$ and $t_2$. In this case, the data can be transmitted to a control system, with the control system being able to determine a relevant difference in the self-discharge rates of the plurality of battery cells. In addition, cell balancing can begin directly at the time $t_2$, since the predefined constraints exist.

FIG. 2 additionally shows that, at a later time $t_3$, the state of charge of each battery cell in the plurality of battery cells can be determined particularly if cell balancing is intended to be performed at the time $t_3$. Between $t_2$ and $t_3$, there may be a period 16 in this case. Hence, $t_3$ corresponds essentially to the time at which cell balancing needs to be performed and hence the need for cell balancing first of all needs to be ascertained.

If, as shown in FIG. 2 at $t_{3-1}$, it is not possible to measure the state of charge at the time $t_3$ under the predefined constraints, which can apply to the reference cell, for example, then cell balancing on the basis of a need that is ascertained by taking account of the relative difference in the self-discharge rates of the plurality of battery cells, as can be ascertained by the states of charge ascertained at $t_1$ and $t_2$, is effected during the period 18.

If, as shown in FIG. 2 at $t_{3-2}$ and $t_{3-3}$, measurement of the state of charge at the time $t_3$ under the predefined constraints is possible, however, then cell balancing is effected during the periods 20, 22 on the basis of a need that has been able to be ascertained by directly taking account of the states of charge of the battery cells at the time $t_3$, or at the time $t_{3-2}$ and $t_{3-3}$.

In addition, it is possible for the cell balancing that has been carried out on the basis of the self-discharge differences to be verified and, if need be, for the self-discharge differences to be redetermined in order to be able to perform constantly highly precise cell balancing operations. By way of example, this step 24 can be effected when cell balancing is possible directly on the basis of the ascertained states of charge. According to FIG. 1, this can be done following the time $t_3$, for example.

In addition, ascertainment of the self-discharge differences of different battery cells is shown in FIGS. 3a and 3b. In this case, the x axis shows each of the different battery cells, in this case eight battery cells as the plurality of battery cells, with the y axis indicating the state of charge (SOC) in %.

FIG. 3a shows ascertainment of the states of charge at the time $t_1$. In this case, the values of the states of charge are referenced to a reference cell, of which the battery cell having the number 1 has been chosen. It can be seen that the states of charge can differ from one another greatly, for example on account of different capacities, with relative values also being able to be greater than 100% as a result of capacity differences and the reference to the reference cell as 100%.

FIG. 3b shows the states of charge that have been ascertained at a time $t_2$. In this case, the states of charge are ascertained particularly when the state of charge of the reference cell has the same value as at the time $t_1$, that is to say is 100%, for example. In particular, provision may additionally be made for the battery cells to be in the same or a comparable relaxation state as at $t_1$. It can be seen that some of the battery cells have a state of charge that differs in comparison with $t_1$. This difference is brought about particularly by the self-discharge of the battery cells, the self-discharge rate of the respective battery cells possibly being different.

The differences in the self-discharge rates of the individual battery cells that are shown on the axis $x_1$ are plotted with reference to the reference cell on the axis $x_2$. In this case, it can be seen that the battery cells 2 and 3 have a higher state of charge with reference to the measurement at $t_1$, the battery cell 5 has a low state of charge with reference to the measurement at $t_1$ and the battery cells 4 and 6 to 8 have no self-discharge difference in relation to the reference cell. Since the battery cell 1 has been selected as the reference cell 1, the states of charge are referenced directly thereto. Hence, it is a simple matter to ascertain the level of the state of charge that needs to be equalized for cell balancing. This is shown on the axis $x_3$. In this case, such cell balancing is based particularly on resistive cell balancing, that is to say discharging the battery cells having a comparatively high state of charge to a state of charge of the battery cell having the comparatively lowest state of charge. According to FIG. 3*b*, this is the battery cell 5, which is why this battery cell has no need for discharge. The other battery cells should therefore be equalized by the amount of their self-discharge. Since the self-discharge differences have been ascertained with reference to the reference cell, the need for equalization of each battery cell can be based on the need of the reference cell, with the corresponding differences in the self-discharge rates needing to be borne in mind in this case. This can clearly be seen in FIG. 3*b* from the axis $x_3$, where the battery cells 2 and 3 have an equalization need that is greater by the amount of their lower self-discharge, and the remainder of the battery cells 4 and 6 to 8 have the equalization need of the reference cell 6.

Hence, the difference in the self-discharge rates of the individual battery cells, $cell_i$, with reference to the reference cell, $cell_{ref}$, as a quantity of charge per unit time can be ascertained as follows:

$$\Delta SOC \frac{[\%]}{[t]} = \frac{[SOC(cell_{i,t2}) - SOC(cell_{ref,t2})] - [SOC(cell_{i,t1}) - SOC(cell_{ref,t1})]}{t2 - t1}$$

The equalization need of each of the battery cells, $cell_i$, additionally takes account of the self-discharge difference of all the cells with respect to the maximum self-discharge, for example as a result of artificial self-discharge. The greatest self-discharge difference is possessed by the battery cell having the greatest negative discrepancy with respect to the reference cell, that is to say cell 5 according to FIG. 3. The excess charge in all the other battery cells can therefore be equalized as follows:

$$\Delta SOC_{bal}(cell_i) \frac{[\%]}{[t]} = \Delta SOC(cell_i) - \Delta SOC(cell_{min})$$

In this case, the value $\Delta SOC_{bal}(cell_i)$ represents the charge to be equalized per unit time. This value can be taken as a basis for performing equalization when a state of charge cannot be determined under optimum conditions.

The invention claimed is:

1. A method for cell balancing for a plurality of battery cells, having the method steps of:
   a) determining the state of charge of each battery cell in the plurality of battery cells at a time $t_1$ on condition that predefined constraints for ascertaining the states of charge of the battery cells exist;
   b) determining the state of charge of each battery cell in the plurality of battery cells at a time $t_2$, there being a selectable period between $t_1$ and $t_2$, on condition that predefined constraints for ascertaining the states of charge of the battery cells exist;
   c) determining a relative difference for the self-discharge rates of the plurality of battery cells on the basis of the states of charge ascertained under method steps a) and b);
   d) determining the state of charge of each battery cell in the plurality of battery cells at a time $t_3$; and
   e) carrying out cell balancing for the plurality of battery cells, wherein
   e1) the cell balancing for the battery cells is effected on the basis of a need that is ascertained by directly taking account of the states of charge of the battery cells at the time $t_3$ when the state of charge of the battery cells at a time $t_3$ can be ascertained on condition that predefined constraints for ascertaining the states of charge of the battery cells exist; or wherein
   e2) the cell balancing for the battery cells is effected on the basis of a need that is ascertained by taking account of the relative difference in the self-discharge rates of the plurality of battery cells when the state of charge of the battery cells at a time $t_3$ cannot be ascertained on condition that predefined constraints for ascertaining the states of charge of the battery cells exist.

2. The method according to claim 1, wherein the predetermined constraints comprise the amount of the state of charge of at least one battery cell and the relaxation state of at least one battery cell.

3. The method according to claim 1, wherein the method has the further method steps of:
   f) verifying the cell balancing for the battery cells according to method step e2) by means of method step e1); and
   g) if need be redetermining a relative difference for the self-discharge rates of the plurality of battery cells.

4. The method according to claim 1, wherein method step e) is effected by specifically discharging at least one battery cell via a discharge resistor.

5. The method according to claim 1, wherein method step c) is effected by selecting a reference cell from the plurality of battery cells and by comparing the self-discharge rates of the remainder of the battery cells in the plurality of battery cells with the self-discharge rate of the reference cell.

6. The method according to claim 1, wherein the state of charge of the battery cells is ascertained by using the respective cell voltage of the battery cells.

7. The method according to claim 1, wherein a need for equalization of the state of charge of the battery cells is ascertained when a battery system is started.

8. A battery system, having a plurality of battery cells, wherein the battery system can ascertain the state of charge of the battery cells and the self-discharge rates of the battery cells and wherein the battery system can additionally perform cell balancing, wherein the battery system has a control unit that is configured to:
   a) determine the state of charge of each battery cell in the plurality of battery cells at a time $t_1$ on condition that predefined constraints for ascertaining the states of charge of the battery cells exist;
   b) determine the state of charge of each battery cell in the plurality of battery cells at a time $t_2$, there being a selectable period between $t_1$ and $t_2$, on condition that predefined constraints for ascertaining the states of charge of the battery cells exist;
   c) determine a relative difference for the self-discharge rates of the plurality of battery cells on the basis of the states of charge ascertained under method steps a) and b);

d) determine the state of charge of each battery cell in the plurality of battery cells at a time $t_3$; and
e) carry out cell balancing for the plurality of battery cells, wherein
e1) the cell balancing for the battery cells is effected on the basis of a need that is ascertained by directly taking account of the states of charge of the battery cells at the time $t_3$ when the state of charge of the battery cells at a time $t_3$ can be ascertained on condition that predefined constraints for ascertaining the states of charge of the battery cells exist; or wherein
e2) the cell balancing for the battery cells is effected on the basis of a need that is ascertained by taking account of the relative difference in the self-discharge rates of the plurality of battery cells when the state of charge of the battery cells at a time $t_3$ cannot be ascertained on condition that predefined constraints for ascertaining the states of charge of the battery cells exist.

9. The battery system according to claim 8, wherein the battery system has a plurality of discharge resistors for selectively discharging each of the battery cells.

10. The battery system according to claim 8, wherein the battery system is arranged in an at least to some extent electrically drivable vehicle.

\* \* \* \* \*